United States Patent [19]

Koops

[11] Patent Number: 5,279,517
[45] Date of Patent: Jan. 18, 1994

[54] METHOD AND APPARATUS FOR EVISCERATING POULTRY

[75] Inventor: Henderikus Koops, Oostzaan, Netherlands

[73] Assignee: Machinefabriek Meyn B.V., Oostzaan, Netherlands

[21] Appl. No.: 926,237

[22] Filed: Aug. 6, 1992

[30] Foreign Application Priority Data

Jun. 17, 1992 [EP] European Pat. Off. ........ 92201764.5

[51] Int. Cl.⁵ .............................................. A22C 21/06
[52] U.S. Cl. .................................... 452/118; 452/117
[58] Field of Search ............... 452/118, 106, 109, 116, 452/117

[56] References Cited

U.S. PATENT DOCUMENTS

| Re. 32,402 | 4/1987 | Graham et al. | 452/117 |
| 3,474,492 | 10/1969 | Viscolosi | 452/118 |
| 3,803,669 | 4/1974 | Dillon | 452/106 |

FOREIGN PATENT DOCUMENTS 0264592 4/1988 European Pat. Off. ............ 452/106

Primary Examiner—Willis Little
Attorney, Agent, or Firm—Dority & Manning

[57] ABSTRACT

A method and apparatus is provided in which an eviscerating means is moved into and out of poultry to be processed. The spine of the poultry extends horizontally and transversely to the direction of conveying the poultry. During the evisceration, the eviscerating means reciprocates horizontally in the direction of the poultry and moves synchronously with the poultry in the direction of conveying during the evisceration.

17 Claims, 3 Drawing Sheets

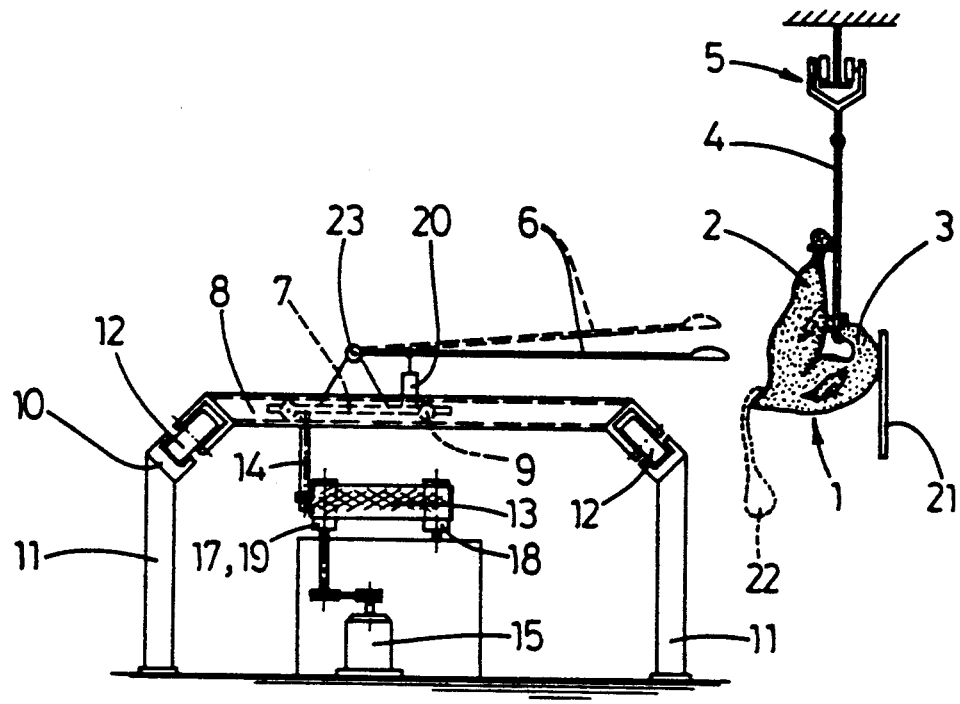
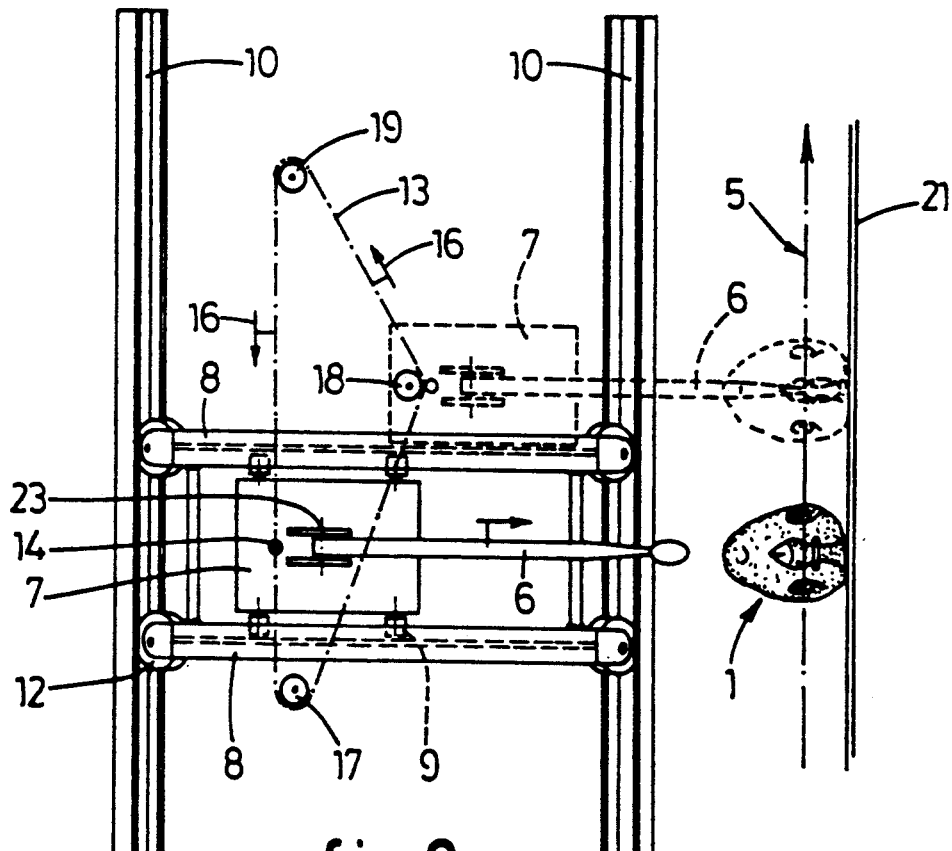

METHOD AND APPARATUS FOR EVISCERATING POULTRY

BACKGROUND OF THE INVENTION

The invention relates to a method and an apparatus for eviscerating poultry, with legs is suspended from a suspension conveyor, wherein the eviscerating means is moved into and out of the poultry.

A known eviscerating means enters into a bird or poultry to be processed in the downward direction. During a following upwardly directed motion the entrails and the like are removed from within the bird. A veterinary inspection of the entrails requires that these hang downwardly over the back of the bird.

Although this known method and means is extremely fit, per se, for eviscerating poultry its application may, under some circumstances, cause problems. While eviscerating turkeys, for example, it is disadvantageous that the entrails hang downwards over the back of the bird, for this may contravene local conditions in respect to hygienics.

SUMMARY OF THE INVENTION

It is an object of the invention to provide a method of the type referred to above, which resolves this disadvantage in a simple, but nevertheless effective way.

The method according to the invention is characterized in that the poultry is maneuvered into such a position, that the spine of the poultry extends substantially horizontally and transversely to the direction of conveying of the poultry and wherein the eviscerating means is moved into and out of the poultry substantially horizontally, whereas eviscerating means is further moved in the conveying direction of the conveyor synchronously with the poultry.

The position of the poultry during the method according to the invention assures, that entrails removed from within the poultry hangs down freely from the bird while still being attached thereto and, thus, cannot lead to a contamination of the outside of the bird.

In a preferred embodiment of the method according to the invention the poultry is suspended from the suspension conveyor by its neck and its feet. As a result, one may easily assure that the poultry is in the desired position in which the spine extends substantially horizontally.

The invention further relates to an apparatus for carrying out the method according to the invention, wherein the poultry with its legs and its neck is suspended from a suspension conveyor. The apparatus is characterized by a driving assembly positioned adjacent to the suspension conveyor for moving the eviscerating means into and out of the poultry synchronously with the poultry while eviscerating.

Preferably, the driving assembly comprises a carriage supporting the eviscerating means, which is displaceable in a horizontal plane. By virtue of such a carriage the required motion of the eviscerating means can be realized in a controlled way.

In this respect it is preferred, that the carriage is reciprocable along a first rectilinear guiding means which itself is reciprocable along a second rectilinear guiding means perpendicularly to the reciprocation of the carriage. Such a combination of two rectilinear guides leads, in a simple, but nevertheless reliable way to the realization of two degrees of freedom, such that the carriage is freely movable in a horizontal plane.

Means to drive the carriage according to a further embodiment of the invention, it is preferred, that below the rectilinear guides, the driving means is provided for engaging the carriage and following an endless track. The driving means may comprise an endless chain, a belt, a girdle or the like, to which a dog is attached for engaging the carriage. The track followed by the endless chain and the dog thus defines the track of the carriage and of the eviscerating means attached to the carriage.

For realizing an effective motion of the eviscerating means the chain, belt, girdle or the like, as seen in the conveying direction, first follows a slanting first track section for moving the eviscerating means into the poultry, next follows an oppositely slanting second track section for moving the eviscerating means out of the poultry and finally follows a returning track section for returning the eviscerating means towards its starting position. When the dog of the endless chain follows the slanting first track section the carriage (and the eviscerating means) has the same velocity as the poultry in the conveying direction of the suspension conveyor. However the carriage (and the eviscerating means) too comprises a motion component perpendicularly to the conveying direction in the direction of the poultry for moving the eviscerating means into the poultry. During the following oppositely slanting second track section the velocities of the poultry and the carriage with eviscerating means (seen in the conveying direction of the conveyor) still are identical, whereas, however, the eviscerating means now is moved out of the poultry. Finally, in the returning track section, the carriage with the eviscerating means is returned to the starting position oppositely to the conveying direction of the conveyor, in which starting position the eviscerating means is spaced a distance far enough from the poultry for passing it.

Further, it is advantageous, if the carriage carries a number of juxta-posed eviscerating means which simultaneously engage different birds. As a result, of the apparatus according to the invention can process a larger number of birds in the same time.

Finally, in another embodiment of the apparatus according to the invention the eviscerating means is supported by the carriage so as to be vertically pivotable. In this respect a biasing device, preferably a fluid cylinder-piston assembly, is positioned between the eviscerating means and the carriage for moving the eviscerating means downwardly. In this way, it is possible to adapt the position of the eviscerating means to the dimensions of a bird to be processed. In the case of a large bird the force exerted on the eviscerating means by the biasing device is set on a high level, such that the eviscerating means strongly presses upon the spine of the bird. If, however, a small bird has to be processed the force is set on a lower level.

Although an eviscerating means has been disclosed above, it is understood that instead of such an eviscerating means other processing means may be applied too, without deviating from the scope of the invention. In this respect, a cloaca cutter or a intestine suction device may be supported instead of the eviscerating means.

BRIEF DESCRIPTION OF THE DRAWINGS

Hereinafter the invention will be elucidated, referring to the drawing in which two embodiments of an apparatus for carrying out the method according to the invention are illustrated, in which:

FIG. 1 is a side elevational view of an embodiment of an apparatus according to the invention;

FIG. 2 is a top plan view of the apparatus of FIG. 1; and

DETAILED DESCRIPTION OF THE INVENTION

Figure 3A:
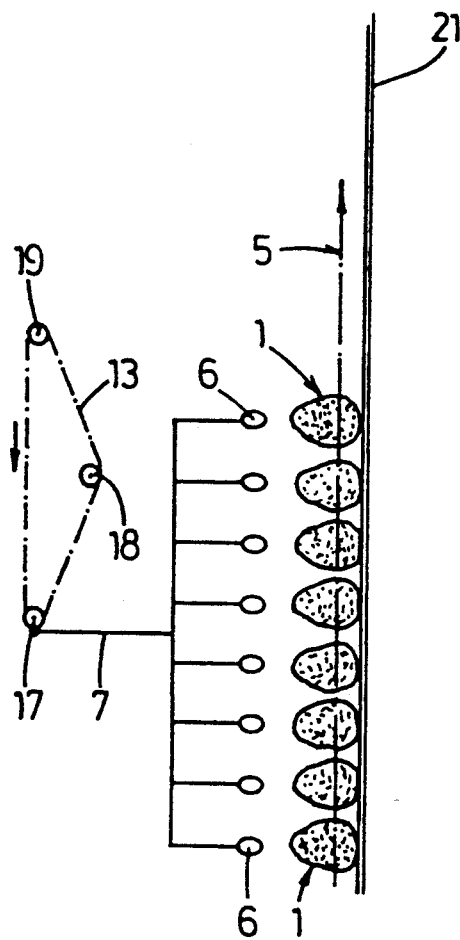
FIG. 3 is a schematic view showing he operation of a second embodiment of the invention.

The apparatus illustrated in FIG. 1 is meant for processing poultry 1, which is suspended by its legs 2 and its neck 3 from the carrying hooks 4 of a suspension conveyor 5, known per se. The carrying hooks 4 are shaped so that the spine of the poultry 1 extends substantially horizontally and transversely to the conveying direction of the suspension conveyor 5 (in FIG. 1 perpendicularly to the plane of the drawing).

It is noted that although the invention is illustrated referring to an apparatus in which the poultry is suspended with its legs and its neck from the carrying hooks of the suspension conveyor, it is also possible to provide other means for ensuring that the spine of the poultry extends horizontally. In this respect, one can imagine guiding means extending below the suspension conveyor, which guide the initially downwardly hanging neck of the poultry upwardly during its passage, thus positioning the poultry horizontally as required.

Adjacent to the suspension conveyor 5 a driving assembly is positioned for moving the eviscerating means 6 into and out of the poultry 1. Further referring to FIG. 2, the driving assembly includes a carriage 7 which carries the eviscerating means 6. The carriage 7 is reciprocable transversely to the conveying direction or path of the suspension conveyor 5 (in FIG. 2 indicated by a dashed and dotted line) and along a first rectilinear guide 8. For this purpose, the carriage 7 comprises wheels 9.

In its turn, the first rectilinear guide 8 comprises a carriage, which is reciprocable perpendicularly to the reciprocation path of the carriage 7 (in parallel to the conveying direction of the suspension conveyor 5) and along a second, stationary rectilinear guide 10 which is supported by feet 11. The carriage-shaped first rectilinear guide 8 includes wheels 12.

Below the rectilinear guide 8 and 10 a driving means is provided for engaging the carriage 7. This driving means, in the illustrated embodiment is an endless belt 13, which follows an endless track indicated in FIG. 2 by a dashed and dotted line that is defined by guiding rolls 17, 18, and 19. A dog 14 is driven by a motor 15. Instead of a belt 13 an endless chain, girdle or the like may be applied too.

When belt 13 is driven by motor 15 in the direction indicated by arrows 16 the dog 14 will move the carriage 7 in a corresponding motion along the rectilinear guides 8 and 10.

The track followed by carriage 7 is defined by the belt extending around the guiding rolls 17, 18 and 19. When the dog 14 follows the track section extending between the guiding rolls 17 and 18 the carriage 7 is displaced in the conveying direction of the suspension conveyor 5 as well as perpendicularly thereto. The velocity with which the belt 13 is driven is such, that the velocity component of the carriage 7 in parallel with the conveying direction of the suspension conveyor 5 equals the conveying velocity of the suspension conveyor 5. In this way the eviscerating means 6 keeps in touch with the poultry conveyed by the suspension conveyor 5. The velocity component of the carriage 7 perpendicularly to the conveying direction of the suspension conveyor 5 sees to it, that the eviscerating means 6 is moved towards the poultry 1 to be processed, as indicated in FIG. 2 starting from the position of the carriage 7 shown in full lines towards the position of the carriage 7 illustrated in dotted lines. In the latter dotted line position the eviscerating means 6 has entered the poultry after which the eviscerating operation may occur.

The actual eviscerating operation occurs when the dog 14 of the belt 13 follows the track section between the guiding roll 18 and the guiding roll 19. While following this track section the velocity component of the carriage 7 in parallel with the conveying direction of the suspension conveyor 5 and equals the conveying velocity of said suspension conveyor. Further, however, the carriage 7 has a velocity component perpendicularly thereto, such that the carriage 7 and the eviscerating means 6 are removed from the poultry 1. As a result of the latter velocity component the eviscerating means 6 (in a way known per se) can complete the eviscerating operation.

From the foregoing, the carriage 7 and eviscerating means 6 attached thereto "keep in touch" or are synchronized with the movement of the poultry 1 to be processed while following the track sections between the guiding rolls 17 and 18 and 19, respectively. After passing guiding roll 19 the carriage 7 with eviscerating means 6 is returned to its starting position oppositely to the conveying direction of the suspension conveyor 5, whereafter a new processing in accordance with the above may occur.

Contrary to what has been said previously the track followed by the belt 13 may have different shapes. A different shape may be defined by another type of process that has to be carried out on the poultry. By way of example, a track in which after the slanting track section, extending between the guiding rolls 17 and 18, a track section is provided which extends parallel with the track of the suspension conveyor 5, ahead of the slanting track section corresponding with the section between the guiding rolls 18 and 19. It is only essentially that in these track sections the component of the velocity of the carriage in parallel with the conveying direction of the suspension conveyor 5 equals the conveying velocity of said suspension conveyor 5. It is also possible that the belt 13, when the dog 14 follows the returning track section between the guiding rolls 19 and 17, is driven at a higher speed than during the remaining track sections, so that the carriage 7 and the eviscerating means 6 are returned to the starting position more rapidly. Especially when the carriage 7 carries only one eviscerating means 6 this can lead to a substantial time saving.

Figure 3B:
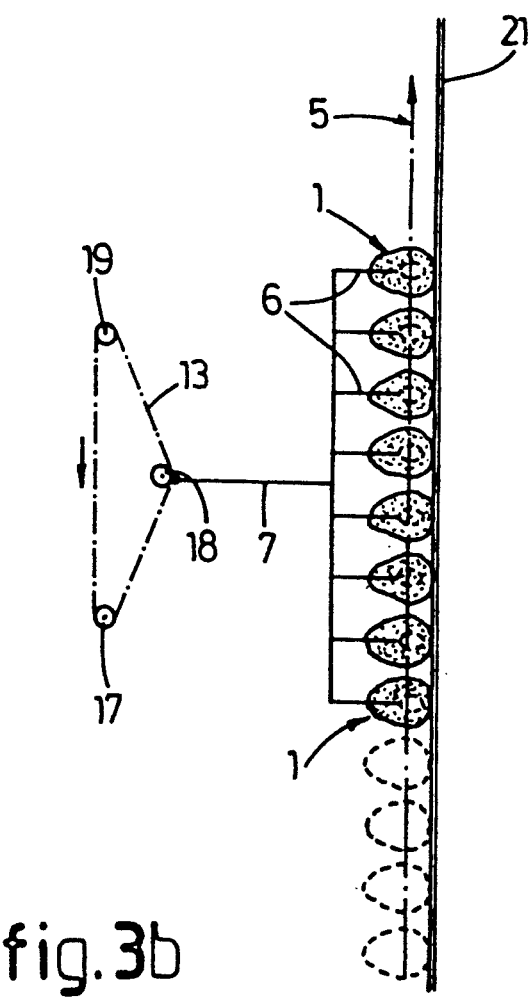
Figure 3C:
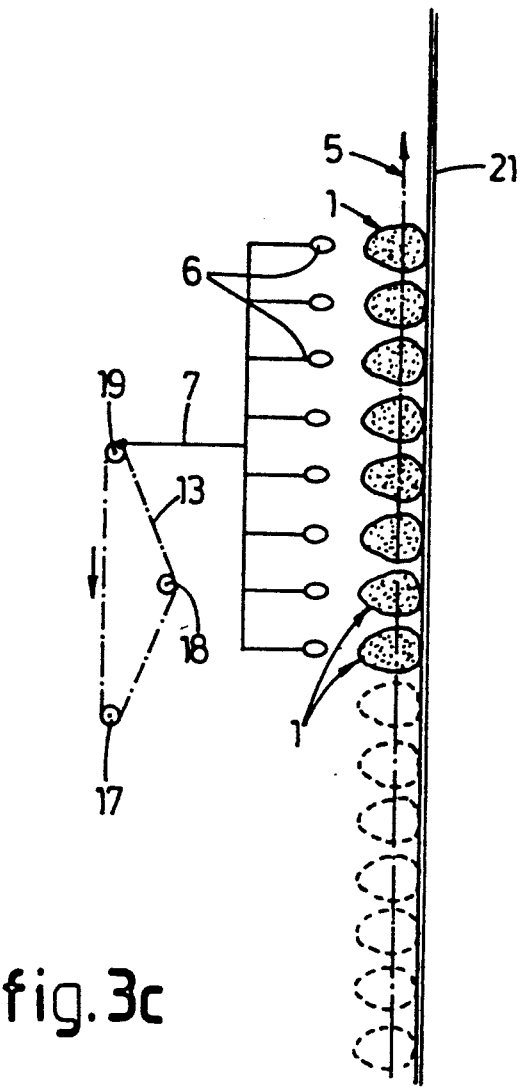
Figure 3D:
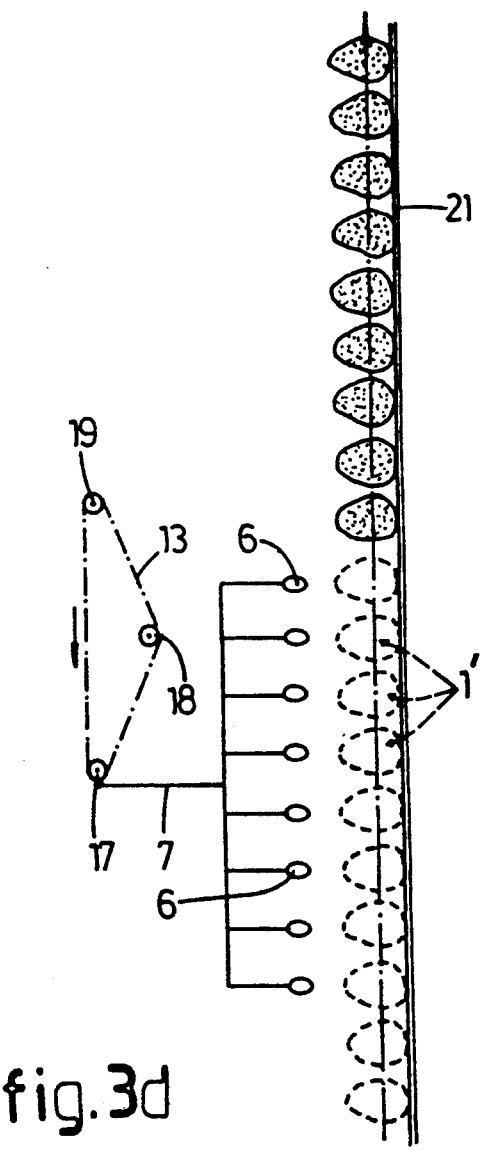

However, in FIG. 3 an alternative embodiment is shown in which the belt 13 continuously has a constant velocity, but in which the processing of the poultry to be processed happens in an optimal way.

FIG. 3 indicates schematically, that the carriage 7 carries a number (in this special case eight) of eviscerating means 6. While following the track section between the guiding rolls 17 and 18 these eviscerating means 6 are entered in a corresponding number of birds 1 (from the position shown in FIG. 3a to a position shown in FIG. 3b). Next, while following the track section between the guiding rolls 18 and 19, the eviscerating means 6 are, for the respective processing, removed from the bird 1 (wherein finally the position shown in FIG. 3c is obtained). Eventually the carriage 7 with the eviscerating means 6 moves along the returning track section between the guiding rolls 19 and 17 towards the starting position (FIG. 3d), whereas the birds 1 are now conveyed by the suspension conveyor a distance so that the eviscerating means 6 can engage a next number of eight birds 1' for carrying out the next operation.

In the embodiment of the apparatus shown in FIG. 3 the respective eviscerating means 6 simultaneously processes a corresponding number of juxta-posed birds suspending from the suspension conveyor. In this way the capacity of the apparatus may be increased considerably.

Further it is shown in FIG. 1 that a device, for example, a fluid cylinder-piston assembly 20, is positioned between the eviscerating means 6 and the carriage 7 for biasing the eviscerating means 6 downwardly. By virtue of this cylinder-piston assembly 20 the force with which the eviscerating means engages the bird to be processed can be adjusted. Such an adjustment may be advantageous when birds having different dimensions have to be processed. In view of being able to provide such a biasing device the eviscerating means 6 is pivotally attached to the carriage through a pivot axis mounted on the carriage 7.

Further FIG. 1 and FIG. 2 illustrate, that at the side of the bird facing away from the driving assembly aside of the suspension conveyor 5 an abutment plate 21 is provided which prevent the birds 1 from moving aside when the eviscerating means 6 engage the birds.

Although previously an eviscerating means has been mentioned it is noted, that different kinds of processing means may be applied without deviating from the scope of the invention. Instead of an eviscerating means, a suction tube for sucking empty the intestines or a cloaca cutter for cutting loose the cloaca of the poultry to be processed. In any event, it is essential that, irrespective of the operation, material removed out of the bird, such as entrails or intestines, while still being connected with the poultry, hangs downward free from the back of the poultry (indicated by the package 22 represented in dotted lines in FIG. 1), such that the undesired contaminations are effectively avoided.

For carrying out the method according to the invention it is essential, that the spine of the birds extends substantially transversely to the conveying direction of the suspension conveyor. In this context, it is possible to apply carrying hooks 4 enabling a rotation of the poultry around the axis of the carrying hooks, so that the spine may be rotated from a position, in which it extends into the conveying direction, towards a position in which it extends perpendicularly to said conveying directing.

The invention is not limited to the embodiments described previously, which may be varied widely within the scope of the invention.

I claim:

1. A method for removing internal organs from poultry carcasses, comprising the following steps:
   (a) suspending carcasses of said poultry from a conveyor and guiding said carcasses so that their spines extend horizontally through at least a portion of a carcass conveyance path;
   (b) moving an organ engaging means in a first path which is transverse to said conveyance path, while at the same time moving said organ engaging means in a second path which is parallel to said conveyance path at a velocity synchronous with the velocity of said conveyor;
   (c) controlling the velocity of said organ engaging means so that said organ engaging means engages at least one of said carcasses at a point in said conveyance path where its spine extends horizontally and enters said carcass to remove internal organs from the interior of said carcass;
   (d) withdrawing said organ engaging means transversely from said carcass as said carcass moves along said conveyance path while at the same time moving said organ engaging means in its second path parallel to said conveyance path at a velocity synchronous with the velocity of said conveyor; and
   (e) reversing the direction of movement for said organ engaging means after it is completely withdrawn from said carcass to return it to a position for engaging another carcass.

2. A method for removing internal organs, as set forth in claim 1, including the step of suspending said carcasses by their feet and their necks to hold said carcasses with their spines in a generally horizontal plane.

3. A method for removing internal organs, as set forth in claim 1, including the step of holding said carcasses against movement as said organ engaging means enters said carcasses.

4. A method for removing internal organs, as set forth in claim 1, including the step of removing internal organs from more than one carcass at the same time.

5. An apparatus for removing internal organs from poultry carcasses, comprising:
   (a) a conveyor for conveying poultry carcasses along a conveyance path;
   (b) means for suspending carcasses from said conveyor so that the spines of said carcasses extend generally horizontally in a direction generally transverse to said conveyance path in at least a portion of said conveyance path;
   (c) an organ engaging means supported on a carriage for movement therewith;
   (d) first rectilinear guide means extending transverse to said conveyance path of said conveyor for supporting said carriage for reciprocal movement transverse to said conveyance path;
   (e) second rectilinear guide means extending parallel to said conveyance path for supporting said first rectilinear guide means for reciprocal movement parallel to said conveyance path; and
   (f) drive means for moving said carriage along said first guide means towards and away from said conveyance path, to and from engagement with at least one of said carcasses and for moving said first guide means reciprocally along said second guide means at a velocity synchronous with the velocity of said conveyor.

6. An apparatus for removing poultry organs, as set forth in claim 5, wherein said first guide means comprise a pair of rigid guide rails for cooperating with rotary means on said carriage.

7. An apparatus for removing poultry organs, as set forth in claim 6, wherein said first guide means comprise a pair of rigid guide rails for cooperating with rotary means on said carriage.

8. An apparatus for removing poultry organs, as set forth in claim 5, wherein said drive means comprises an endless flexible drive member guided about a plurality of rotary guide members and is connected to said with a dog for moving said carriage in a path corresponding to the path followed by said flexible drive member.

9. An apparatus for removing poultry organs, as set forth in claim 8, wherein said flexible drive member is an endless chain.

10. An apparatus for removing poultry organs, as set forth in claim 8, wherein said flexible drive member is an endless belt.

11. An apparatus for removing poultry organs, as set forth in claim 8, wherein said flexible drive member is an endless girdle.

12. An apparatus for removing poultry organs, as set forth in claim 8, wherein said flexible drive member follows a path which is inclined towards said conveyance path to move said organ engaging means towards a carcass carried by said conveyor to a point where said organ engaging member enters said carcass to engage said organs.

13. An apparatus for removing poultry organs, as set forth in claim 8, wherein said flexible drive member follows a path which is inclined away from said conveyance path after said organ engaging member enters said carcass to move said organ engaging member from said carcass to remove said organs from said carcass.

14. An apparatus for removing poultry organs, as set forth in claim 8, wherein said flexible drive member follows a path which is spaced from said conveyance path and which moves said carriage in a direction opposite to the direction said conveyor moves to return said carriage to its original position.

15. An apparatus for removing poultry organs, as set forth in claim 5, wherein said carriage supports a plurality of spaced organ engaging means for engaging and entering a plurality of spaced carcasses carried by said conveyor.

16. An apparatus for removing poultry organs, as set forth in claim 5, wherein said organ engaging member is pivotally mounted on said carriage for vertical movement relative to said carriage.

17. An apparatus for removing poultry organs, as set forth in claim 16, wherein a piston-cylinder assembly is interposed between said carriage and said organ engaging means for selectively biasing said engaging member downwardly.

* * * * *